United States Patent
Sohail et al.

(10) Patent No.: US 11,146,626 B2
(45) Date of Patent: Oct. 12, 2021

(54) CLOUD COMPUTING ENVIRONMENT WITH REPLICATION SYSTEM CONFIGURED TO REDUCE LATENCY OF DATA READ ACCESS

(71) Applicant: EMC IP Holding Company LLC, Hopkinton, MA (US)

(72) Inventors: Mohamed Sohail, Sheikh Zayed (EG); Junping Zhao, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/177,616

(22) Filed: Nov. 1, 2018

(65) Prior Publication Data
US 2020/0145480 A1 May 7, 2020

(51) Int. Cl.
*H04L 29/08* (2006.01)
*G06F 16/951* (2019.01)

(52) U.S. Cl.
CPC ........ *H04L 67/1014* (2013.01); *G06F 16/951* (2019.01); *H04L 67/1095* (2013.01); *H04L 67/1097* (2013.01)

(58) Field of Classification Search
CPC ............. H04L 67/1014; H04L 67/1097; H04L 67/1095; H04L 67/1004; G06F 16/951
See application file for complete search history.

(56) References Cited

U.S. PATENT DOCUMENTS

| | | | | |
|---|---|---|---|---|
| 7,149,771 | B1* | 12/2006 | Gifford | H04L 29/12009 709/203 |
| 9,293,194 | B2* | 3/2016 | Gurgi | G11C 11/5628 |
| 9,785,360 | B1* | 10/2017 | Ravindranath | G06F 3/0611 |
| 9,882,985 | B1 | 1/2018 | Esam et al. | |
| 10,069,914 | B1* | 9/2018 | Smith | H04L 63/0428 |
| 10,126,980 | B2* | 11/2018 | Laden | G06F 3/067 |
| 10,425,477 | B2* | 9/2019 | Trandafir | H04L 67/2804 |
| 10,776,384 | B1* | 9/2020 | Jackson | G06F 16/282 |
| 10,860,550 | B1* | 12/2020 | Chheda | G06F 16/2379 |

(Continued)

OTHER PUBLICATIONS

Dell EMC, "Dell EMC Recoverpoint: Continuous Data Protection for Any Point in Time Recovery," http://www.emc.com.storage/recoverpoint/recoverpoint.htm, Data Sheet, Sep. 2016, 4 pages.

(Continued)

*Primary Examiner* — Javier O Guzman
(74) *Attorney, Agent, or Firm* — Ryan, Mason & Lewis, LLP (57) ABSTRACT

Systems and methods are provided to configure a replication system to reduce latency of data read access operations in a cloud computing environment. Intelligent routing decision systems and methods are implemented in conjunction with a distributed replication system in a cloud computing environment to direct write requests to a primary site (e.g., production site) by default, and to automatically and intelligently direct read requests to a target site (e.g., primary site or replica site) to reduce data read latency and/or bandwidth. A reduction in read delay is achieved, in part, by intelligently selecting a target site (e.g., data center) in a cloud computing environment which is close or closest in distance to a requesting entity (e.g., user or application) requesting data, thereby reducing a propagation delay and/or latency in accessing and downloading data from the target site.

20 Claims, 6 Drawing Sheets

(56) References Cited

U.S. PATENT DOCUMENTS

| | | | | |
|---|---|---|---|---|
| 2003/0217119 | A1* | 11/2003 | Raman | H04L 67/1095 709/219 |
| 2004/0162885 | A1* | 8/2004 | Garg | G06F 16/27 709/213 |
| 2005/0120134 | A1* | 6/2005 | Hubis | G06F 12/0866 709/238 |
| 2009/0138632 | A1* | 5/2009 | Miura | G06F 13/1673 710/52 |
| 2009/0182945 | A1* | 7/2009 | Aviles | H04L 67/1097 711/122 |
| 2009/0193147 | A1* | 7/2009 | Lepeska | H04L 67/101 709/241 |
| 2010/0036952 | A1* | 2/2010 | Hazlewood | H04L 61/1523 709/226 |
| 2011/0276758 | A1* | 11/2011 | Garmiza | G06F 3/0613 711/114 |
| 2012/0159099 | A1* | 6/2012 | Lindamood | G06F 11/2094 711/162 |
| 2013/0151795 | A1* | 6/2013 | Lee | G06F 13/18 711/151 |
| 2013/0311674 | A1* | 11/2013 | Garcia-Luna-Aceves | H04L 29/12009 709/241 |
| 2015/0341466 | A1* | 11/2015 | Sah | G06F 16/2471 707/770 |
| 2016/0142350 | A1* | 5/2016 | Mutha | H04L 51/04 709/206 |
| 2016/0337426 | A1* | 11/2016 | Shribman | H04N 21/8456 |
| 2017/0013058 | A1* | 1/2017 | Annamalai | H04L 67/1095 |
| 2017/0054802 | A1* | 2/2017 | Annamalai | H04L 67/42 |
| 2017/0126812 | A1* | 5/2017 | Singhal | H04L 67/142 |
| 2017/0206148 | A1* | 7/2017 | Mehta | G06F 11/2097 |
| 2018/0278685 | A1* | 9/2018 | Tiwari | H04L 67/1097 |
| 2018/0314750 | A1* | 11/2018 | Merriman | G06F 16/278 |
| 2018/0357019 | A1* | 12/2018 | Karr | G06F 3/061 |
| 2019/0163371 | A1* | 5/2019 | Nambiar | G06F 3/0608 |

OTHER PUBLICATIONS

R. Goyal et al., "Analysis and Simulation of Delay and Buffer Requirements of Satellite-ATM Networks for TCP/IP Traffic," IEEE Journal of Selected Areas in Communications, Sep. 30, 1998, 24 pages.

link-labs.com, "An In-Depth Look at IoT in Agriculture & Smart Farming Solutions," https://www.link-labs.com/blog/iot-agriculture, Nov. 30, 2017, 4 pages.

* cited by examiner

CLOUD COMPUTING ENVIRONMENT WITH REPLICATION SYSTEM CONFIGURED TO REDUCE LATENCY OF DATA READ ACCESS

FIELD

The field relates generally to cloud computing systems and, in particular, to techniques for optimizing user access to stored data in cloud computing systems.

BACKGROUND

Currently, cloud computing services are provided globally to millions of users and customers who reside in different geolocations (e.g., countries, continents, etc.). Various entities provide private or public cloud computing services globally to different customers over various sectors for critical and non-critical applications. These entities provide various cloud computing services including, for example, software-as-a-service (SaaS), infrastructure-as-a-service (IaaS), and/or platform-as-a-service (PaaS). A cloud computing infrastructure typically utilizes multiple data centers for data protection, high availability and high performance, and to otherwise provide sufficient quality of service (QoS) for successful service delivery and to meet the obligations of service level agreements (SLAs) with the cloud customers. For example, automated data replication and disaster recovery systems are typically implemented in cloud computing systems that utilize several remote data centers for data replication and protection. These systems are particularly useful for Internet of Things (IoT) eco-systems, which are a key enabler for many emerging and future "smart" applications, where there is expected to be an exponential increase in the amount of IoT data generated by massive amounts of network connected IoT devices, objects, and autonomous things, which are connected over a communications network such as the Internet to support various IoT application domains.

For cloud computing applications, data access delay is a primary performance metric that impacts service quality and customer satisfaction. While data replication and disaster recovery systems rely on the use of several data centers for remote replication, the replicated data which is stored at replica sites is only utilized for purposes of data recovery, which leads to underutilization of the replicated data at the replica sites.

SUMMARY

Embodiments of the invention include methods for configuring a replication system to reduce latency of data read access operations in a cloud computing environment. For example, in one embodiment, a method comprises: configuring a data replication system to execute on a plurality of sites of a computing system, wherein the plurality of sites comprises a primary site and at least one replica site, wherein the primary site comprises a primary storage to store primary data of a given application, and wherein the at least one replica site comprises a replica storage to store a replica of the primary data; receiving a data access request from a requesting user; responsive to the data access request comprising a data write request, routing the data write request to the primary site to write data to the primary storage; responsive to the data access request comprising a data read request, determining which site of the plurality of sites of the computing system for handling the data read request; wherein determining comprises utilizing a database of routing decision data to determine a given site of the plurality of sites which provides a lowest read access latency for accessing data from the given site for the requesting user; and routing the data read request to the at least one replica site, in response to determining that the at least one replica site provides a lower read access latency for accessing data from the replica storage as compared to accessing data from the primary storage.

Other embodiments of the invention include, without limitation, computing systems and articles of manufacture comprising processor-readable storage media for configuring a replication system to reduce latency of data read access operations in a cloud computing environment.

DETAILED DESCRIPTION

Embodiments of the invention will be described herein with regard to systems and methods for configuring a replication system to reduce latency of data read access operations in a cloud computing environment. As explained in further detail below, intelligent routing decision systems and methods are implemented in conjunction with a distributed replication system in a cloud computing environment to direct write requests to a primary site (e.g., production site) by default, and to automatically and intelligently direct read requests to a target site (e.g., primary site or replica site) to reduce data read latency and/or bandwidth. A reduction in read delay is achieved, in part, by intelligently selecting a target site (e.g., primary or remote data center) in a cloud computing environment which is close or closest in distance to a requesting entity (e.g., user or application) requesting data, and thereby minimizing the propagation delay and/or latency in accessing and downloading data from the target site. In the context of cloud computing with data centers located in different geographic locations (e.g., different continents), the propagation delay and/or latency in accessing and downloading data is directly proportional to the distance between the requesting entity (e.g., user or application) and the target site in which the data is stored. Embodiments of the invention serve to enhance quality of service (QoS) of cloud computing for read-intensive applications such as IoT data analytics, database, streaming, Web applications, etc.

Figure 1:
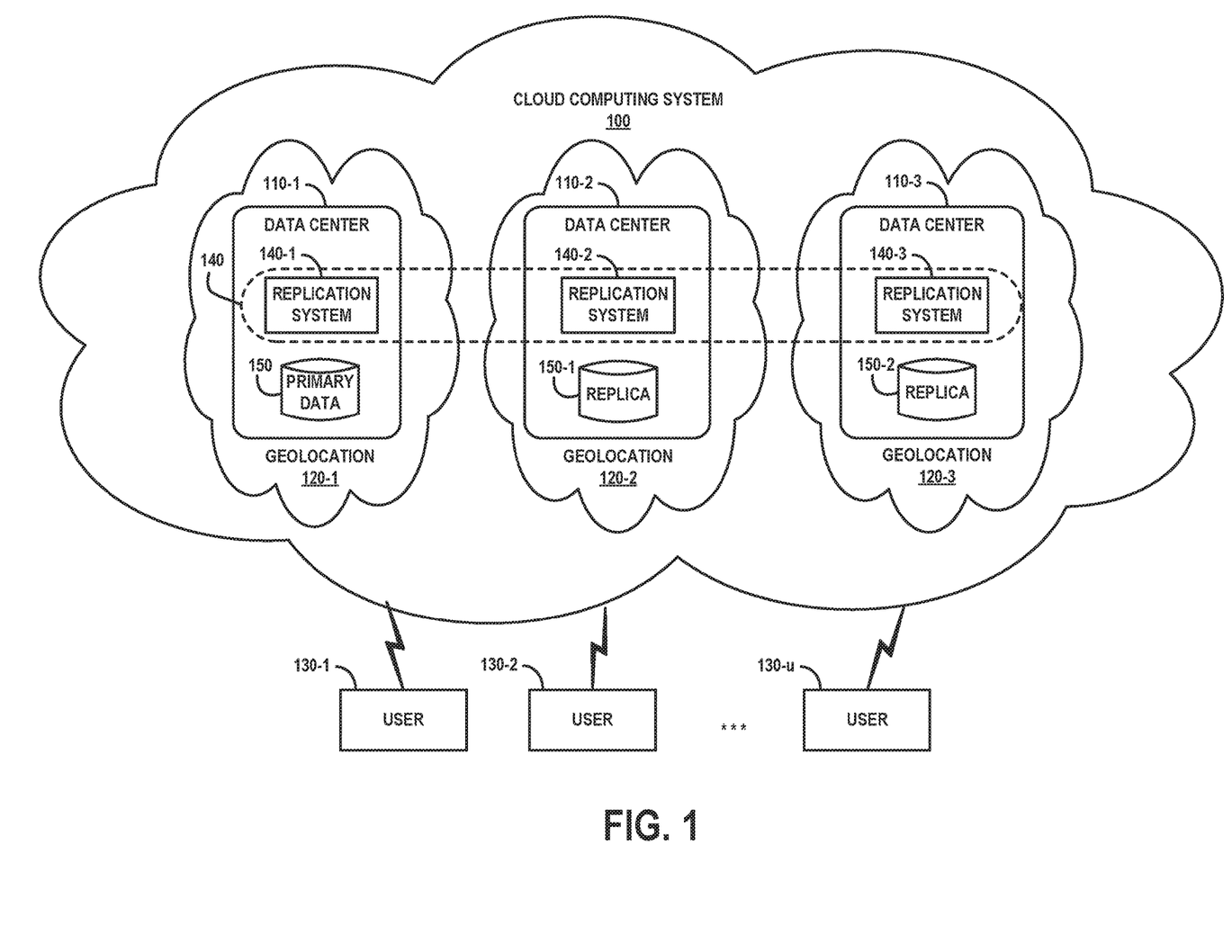
FIG. 1 illustrates a cloud computing environment in which techniques according to embodiments of the invention can be implemented for configuring a replication system to reduce latency of data read access operations in the cloud computing environment.

FIG. 1 illustrates a cloud computing environment in which techniques according to embodiments of the invention can be implemented for configuring a replication system to reduce latency of data read access operations in the cloud computing environment. In particular, FIG. 1 schematically illustrates a cloud computing system 100 which comprises a plurality of data centers 110-1, 110-2, and 110-3 that are located in different geographic locations (geolocations) 120-1, 120-2, and 120-3 across the cloud computing system 100. FIG. 1 further illustrates a plurality (u) of users 130-1, 130-2, . . . , 130-u (or applications) which can access the cloud computing system 100 and upload data for a given application and/or access and download data for a given application. The data is stored in data storage systems within the data centers 110-1, 110-2, and 110-3.

The geolocations 120-1, 120-2, 120-3 shown in FIG. 1 generically represent different geographic locations in which the data centers 110-1, 110-2, and 110-3 of the cloud computing system 100 reside. The geolocations 120-1, 120-2, and 120-3 shown in FIG. 1 may represent different continents of the world, different countries, different regions within a given continent, different regions within a given country, etc., or any combination thereof. While three data centers and three geolocations are shown in FIG. 1 for ease of illustration, the cloud computing system 100 may comprise any number of data centers to support one or more cloud-based applications or otherwise provide cloud computing services such as SaaS, IaaS, and/or PaaS. The number of data centers may or may not be the same as the number of different geolocations shown in FIG. 1. For instance, the geolocation 120-1 may represent a country (e.g., the United States), which may have one data center 110-1, or more than one data center located in different sub-geolocations within the given geolocation 120-1. The plurality of users 130-1, 130-2, . . . , 130-u represent different users (or applications) that reside within, or near, or far from the various geolocations 120-1, 120-2, and 120-3 shown in FIG. 1.

The cloud computing system 100 further comprises a data replication system 140 which is distributed over the data centers 110-1, 110-2, and 110-3. In particular, as shown in FIG. 1, the data replication system 140 comprises replication systems 140-1, 140-2 and 140-3 which reside and execute in the respective data centers 110-1, 110-2, and 110-3. In one embodiment, the data replication system 140 is configured as a continuous data protection and disaster recovery system in which primary data 150 (e.g., production data) stored in a production site (e.g., data center 110-1) is replicated to one or more remote sites (e.g., data centers 110-2 and 110-3) which store replicas 150-1 and 150-2 of the primary data 150. In one embodiment, the replication systems 140-1, 140-2, and 140-3 are implemented using dedicated physical computing appliances. In another embodiment, the replication systems 140-1, 140-2, and 140-3 are implemented as virtual appliances (e.g., virtual machines, container applications, etc.) which execute on servers. In another embodiment, the replication systems 140-1, 140-2, and 140-3 are implemented using a combination of physical computing appliances and virtual appliances. The various components of the distributed replication system 140 operate as a single logical entity though communication and coordination of data replication operations over the distributed replication systems 140-1, 140-2, and 140-3.

With conventional replication systems, the replicated data (e.g., replicas 150-1 and 150-2) in the remote replication sites (e.g., data centers 110-2 and 110-3) are only utilized in situations of data corruption or disaster recovery, when there is a need for failover. In particular, with conventional data replication systems, under normal operation, the replicated data in the replica storage 150-1 and 150-2 in the remote data enters 110-2 and 110-3 would only be accessible by the replication systems 140-2 and 140-3 for writing data to the replica storage 150-1 and 150-2. The replica storage 150-1 and 150-2 would only be accessible by host servers in the data centers 110-2 and 110-3 in an "access image" mode or in a "failover" situation.

In accordance with embodiments of the invention, the replication system 140 is configured in the cloud computing system 100 to allow "data read" access to the replica storage 150-1 and 150-2 by host servers in the data centers 110-2 and 110-3 with the objective to reduce, or otherwise minimize, the data read latency for the users 130-1, 130-2, . . . , 130-u (e.g., applications) which access data in the cloud computing system 100. The ability to provide read access to data in the replica storage 150-1 and 150-2 in the cloud computing system 100 serves to enhance the quality of service for read-intensive applications such as IoT, big data analytics, database applications, web applications, etc.

For example, in an IoT cloud computing system that is configured to support one or more application domains, the cloud computing system 100 would need to manage and process IoT data received from various IoT devices across various application domains including, but not limited to, healthcare, home and building, retail, energy, manufacturing, transportation, logistics, and/or media domains. By way of example, for the healthcare domain, IoT devices can be utilized for remote health monitoring and emergency notification. Health monitoring devices include blood pressure and heart monitors, pacemakers, hearing aids, etc. Insurance companies can utilize IoT data to automatically track and reconcile insurance claims and ensure proper payments are made to claimants. Furthermore, for the home and building domain, IoT devices can be implemented to monitor and control mechanical, electrical and electronic systems that are utilized in residential, commercial or industrial buildings. For example, home and building automation systems can implement IoT devices/sensors to automatically control lighting, heating, ventilation, air conditioning, appliances, communication systems, entertainment and home security devices, etc.

Moreover, for the energy domain, IoT sensors and actuators can be implemented, for example, in energy consuming devices (e.g., switches, power outlets, light bulbs, etc.) and be equipped to communicate with power supply companies to provide IoT data that enables the power supply companies to effectively balance power generation and energy usage through "smart grids." For example, IoT devices would enable power supply companies to acquire and process IoT data with regard to energy usage in various regions and automatically control and manage production and distribution of electricity in such regions, e.g., control and manage distribution devices such as transformers. In addition, for the manufacturing domain, IoT devices can be used for network control and management of manufacturing equipment or manufacturing process control.

In an embodiment where the cloud computing system 100 supports one or more IoT application domains, the cloud computing system 100 can acquire and process large amounts of data received from billions of IoT devices at various geolocations, and be configured to enable cross-domain interaction and platform unification through increased system compatibility, interoperability and functional exchangeability. In this regard, the amount of IoT data that the cloud computing system 100 acquires for processing can exponentially grow over time.

Indeed, IoT applications and other cloud-based applications exhibit the following distinct patterns. For example, such applications are data intensive, wherein massive amounts of data are continuously generated from large numbers of sensors and devices. In one specific example, a smart field can be implemented using an array of sensors (e.g., humidity sensors, temperature sensors, etc.), wherein a sensor is located every 1-10 meters in a given array (e.g., a 10 square kilometer array), Assuming 1 KB of data (e.g., humidity data, temperature data, etc.) is generated by each sensor per minute, the sensor array would generate more than one terabyte (TB) of data per day, which results in a massive amount of data being ingested by the cloud computing system 100. Another IoT example is video surveillance systems which could generate even more data.

Furthermore, the data which is generated for IoT applications and other cloud-based applications is globally accessed by many users/applications over various geolocations. Indeed, once the massive amount of IoT data is ingested into the cloud computing system 100, the data is typically accessed globally by different requesting entities (e.g., users or applications) from different locations (e.g., across different sites, cities or countries) for different purposes.

Moreover, IoT applications have distinct data access operations. In particular, IoT data is generated by edge sensors and/or edge devices, and such machine-generated data is ingested to the cloud computing system 100. Once the machine-generated data is ingested, the data can be distributed or replicated to one or more data centers or sites, and globally accessed in read mode by many users and/or applications for purposes of analyzing the data in read mode (e.g., analyzing IoT data is a valuable aspect of IoT computing). This use pattern also aligns with many cloud-based applications including, for example, web applications, news media, photo sharing, etc., wherein data replication and global sharing are important backbone building blocks for such applications.

The ability to meet performance requirements (e.g., bandwidth, latency or delay) in a cloud computing system is a challenge for quality of service satisfaction. Data access delay (e.g., latency) is a primary performance metric that impacts service quality and customer satisfaction. While the data access latency is affected by a number of factors, the data access latency is primarily impacted by the physical distance between the cloud user and the data centers from which data is accessed, wherein propagation delay is based on the distance. Bandwidth is important for data analytics such as loading massive data. Thus, it is highly desirable to minimize the data access latency for IoT data and other read-intensive data analytics, irrespective of which site in the computing system the data is stored. Since a cloud computing system can be a global network that is distributed over multiple continents, signal propagation delay is a significant parameter in the cloud read/write access performance.

Embodiments of the invention provide enhancements to data replication systems in a cloud computing infrastructure by utilizing replication sites to reduce or minimize read access delay for applications in a cloud computing environment. Data access delay is a primary performance metric that impacts the service quality and customers' satisfaction. Data replication in cloud computing depends on using several remote data centers for data protection. Embodiments of the invention utilize replica sites to reduce or minimize the delay of reading the data by the global users through the use of intelligent routing decision systems that are configured to, e.g., select a data center with primary or replication data, which shows a reduced or minimum read delay for the user who requests data. Embodiments of the invention allow many types of applications to run on top of, e.g., IoT data without modifying the applications. Embodiments of the invention implement an intelligent routing decision layer in an I/O path between an application and a replication system to provide a transparent method for automatically and intelligently routing read access requests to replica sites to reduce or minimize access delay.

Figure 2:
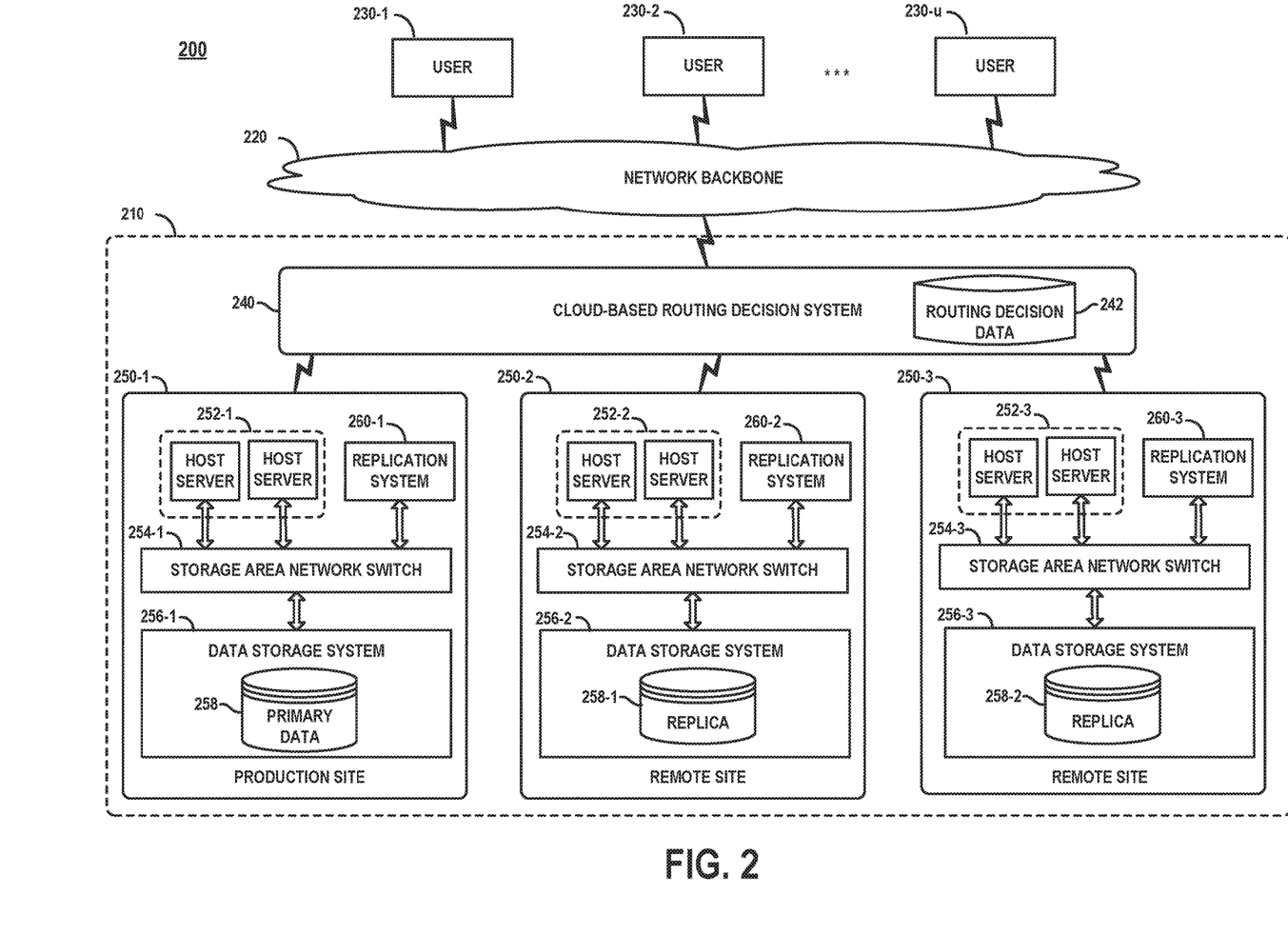
FIG. 2 schematically illustrates a cloud computing system which implements a data replication system that is configured to provide data read access to replica storage, according to an embodiment of the invention.

FIG. 2 schematically illustrates a cloud computing system 200 which implements a data replication system that is configured to provide data read access to replica storage, according to an embodiment of the invention. The cloud computing system 200 comprises a distributed computing system 210 and a communications network 220. A plurality of users 230-1, 230-2, . . . 230-$u$ (or applications) located across various geolocations can access the computing system 210 over the communications network 220. The communications network 220 may comprise, for example, a global computer network such as the Internet, a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the communications network 220 in some embodiments therefore comprises combinations of multiple different types of communications networks each comprising network devices configured to communicate using Internet Protocol (IP) or other related communication protocols. The communications network 220 comprises intermediate points (e.g., routers, switches, etc.) and other elements that form a network backbone to establish communication paths and enable communication between network endpoints.

The computing system 210 comprises a cloud-based routing decision system 240, and a plurality of data centers 250-1, 250-2, and 250-3. The routing decision system 240 generates and maintains a database of routing decision metadata 242, which is utilized by the routing decision system 240 to intelligently route write and read requests received from requesting entities (e.g., users 230 or applications) to target site within the computing system 210 as discussed in further detail below. In one embodiment, the routing decision system 240 executes on one or more gateway servers in an input/output path between the computing system 210 and the users 230 or applications that issue data access requests (e.g., data read, data write, data read-after-data write, etc.).

The data center 250-1 comprises a plurality of host servers 252-1 (e.g., application servers), a storage area network switch 254-1, a data storage system 256-1 which comprises primary data storage 258 to store primary data (e.g., production data), and a replication system 260-1. The data center 250-2 comprises a plurality of host servers 252-2 (e.g., application servers), a storage area network switch 254-2, a data storage system 256-2 which comprises a replica data storage 258-1, and a replication system 260-2. Similarly, the data center 250-3 comprises a plurality of host servers 252-3 (e.g., application servers), a storage area network switch 254-3, a data storage system 256-3 which comprises a replica data storage 258-2 to store replica data, and a replication system 260-3.

In the exemplary embodiment of FIG. 2, the data center 250-1 is depicted as being a production site or primary site where the data storage system 256-1 stores the primary data 258 for a given application, and the data centers 250-2 and 250-3 are depicted as being replica sites in which the respective data storage systems 256-2 and 256-3 store replicas 258-1 and 258-2 of the primary data 258. In one embodiment, the data storage systems 256-1, 256-2, and 256-3 are implemented as storage area networks (SAN) (block-level storage) which include storage arrays that are implemented using storage devices such as hard disk drives (HDDs), flash memory devices, solid-state drive (SSD) devices, etc. In a SAN system, the data within a storage array is typically organized into Logical Units (LUNs) (for block-level storage), wherein storage I/O commands (e.g., Small Computer Systems Interface (SCSI) I/O commands, or other storage interface protocols) are sent to a storage target and executed by an LU within that target. A Logical Unit Number (LUN) is a unique identifier that is used to distinguish between separate devices, or logical units, that share the same bus (e.g., SCSI bus). A LUN can represent a single storage device (e.g., HDD or flash memory device), a portion of a storage device, or a full storage array. The storage I/O commands that are sent to a data storage controller (e.g., SCSI controller) utilize LUNs to identify target storage devices. The data storage systems 256-1, 256-2 and 256-3 can be implemented using commercially available storage array systems of Dell EMC including, but not limited to, XtremIO, UNITY, VMAX, VNX, ScaleIO, etc.

The replication systems 260-1, 260-2, and 260-3 are implemented using a combination of physical computing appliances and virtual appliances to provide a distributed replication system 260 which operates as a single logical entity though communication and coordination of data replication operations over the distributed replication systems 260-1, 260-2, and 260-3. The cloud-based routing decision system 240 (e.g., a cloud enabler gateway sever) is configured as a coordination module which communicates with the replication system 260. The routing decision metadata 242 comprises a mapping of the LUNs of the primary storage 258 and the LUNs of the replica storage 258-1 and 258-2. The mapping is synchronized with the LUN mappings maintained by the replication systems 260-1, 260-2, and 260-3. As explained in further detail below, the routing decision metadata 242 comprises other types of information and metadata that is utilized by the routing decision system 240 for intelligently routing read requests to a target replica site or primary site. The host servers 252-2 and 252-3 in the respective remote data centers 250-2 and 250-3 have read-only access to the protected volumes of the respective replica storage 258-1 and 258-2.

The routing decision system 240 is configured to automatically route write requests received from the users 230 to the primary data center 250-1 for writing data to the primary data storage 258, which serves as the replication source. The routing decision system 240 is configured to intelligently route read requests received from the users 230 to a target data center (e.g., a replica data center or a primary data center) based on a coordination policy (e.g., closest data center, least loaded data center, advanced affinity setting, etc.) to minimize the signal propagation and latency and to improve the bandwidth. By way of example, assuming the user 230-1 in FIG. 2 is located closest to the primary data center 250-1 (as compared to the replica sites 250-2 and 250-23), the routing decision system 240 will route all write and read requests from the user 230-1 to the primary data center 250-1. Assume further that the user 230-2 is located closest to the replica site 250-2 (as compared to the primary site 250-1 and replica site 250-3), the routing decision system 240 will route write requests from the user 230-2 to the primary site 250-1, and will route all read requests from the user 230-2 to the replica site 250-2 to reduce the read access delay.

In one embodiment, the data replication systems discussed herein (e.g., replication system 260-1, 260-2, and 260-3) can be implemented using the RecoverPoint® system offered by Dell EMC®. RecoverPoint is a continuous data protection and disaster recovery system which supports both asynchronous and synchronous data replication of block-based storage. RecoverPoint can be configured to replicate data on a LUN level from a primary production site to one or more remote sites. RecoverPoint supports various storage array systems such as Dell EMC XtremIO, UNITY, VMAX, VNX, ScaleIO, and other 3rd party storage arrays via VPLEX. RecoverPoint can be utilized in one of various configuration to provide (i) local data protection, (ii) remote data protection, or (iii) both local and remote data protection.

In particular, for local data protection (e.g., operational and application recovery needs), RecoverPoint can be configured as a continuous data protection (CDP) system which continuously captures and stores data modifications and enables point-in-time (PiT) recovery with no data loss. In the CDP mode, a local replication of primary data is maintained at the same site (e.g., production site) in which the primary data in stored in a block-based storage array. In the CDP mode, changes to data are tracked at a block level and these changes are maintained in a journal. RecoverPoint obtains a copy of every write in order to track data changes. Every data write is tracked and stored as a different snapshot, or a set of consecutive data writes are aggregated and stored as an aggregate snapshot (which reduces storage space and network traffic). The journal information is then utilized to roll back the data state to a previous PiT prior to a data corruption event.

In addition, for remote data protection (e.g., disaster recovery purposes), RecoverPoint can be configured as a continuous remote replication (CRR) system which supports synchronous and asynchronous replication between remote sites over Fibre Channel or wide area network (WAN). In the CRR mode, the primary data stored at the production site is replicated to one or more remote sites. In CRR mode, a cluster of RecoverPoint appliances is deployed in both the local and remote sites, wherein two clusters communicate over either Fibre Channel or Internet Protocol (IP) over local area network (LAN) or wide area network (WAN). The RecoverPoint appliances utilize data compression and data de-duplication to reduce traffic over the LAN or WAN.

For both local and remote data protection, RecoverPoint can be configured as a concurrent local and remote replication (CLR) system. In the CLR mode, a local replica of the primary data is stored at the production site, and a remote replication of the primary data is stored in one or more remote sites (e.g., replica site). In this regard, a CRR mode is combined with a CDP mode to implement a CLR mode. In RecoverPoint, a "replication set" comprises a protected SAN-attached storage volume from the production site and its replica (e.g., local replica or remote replica).

In general, the RecoverPoint system comprises constituent components such as RecoverPoint software, RecoverPoint appliances, write splitters, etc. A RecoverPoint appliance (RPA) manages aspects of data protection and data replication. An RPA can be a physical RPA or a virtual RPA which is software-based instance of an RPA appliance. A virtual RPA utilizes the services and hardware components of a given server cluster or platform (e.g., ESX platform) on which the virtual RPA is deployed. A physical RPA comprises dedicated Fibre Channel, WAN and LAN interfaces. Fibre Channel is used for data exchange with local host applications and storage subsystems. LAN or WAN is utilized to transfer data to other RPAs.

A RecoverPoint write splitter is configured to split (e.g., duplicate) write operations. For example, to execute a data write operation, a host server (e.g., server 252-1) in the production site (e.g., data center 250-1) sends a data write request to an RPA (e.g., replication system 260-1) in the primary site, and then a duplicate of the data write request is sent by the host server to the primary storage volume (e.g., primary data storage 258). In one configuration, host-based write splitting is implemented using a device driver which executes on the host servers that access the storage volumes. In other embodiments, a write splitter is integrated/embedded within certain Dell EMC storage array systems such as the VNX, VMAX, VPLEX storage systems. In all embodiments, the function of the write splitter in the production site (e.g., data center 250-1) is to split the I/Os so that both the RPA (e.g., the replication system 260-1) and the storage array (e.g., 256-1) receive a copy of the data write request, while maintaining write-order fidelity. In the remote replica sites (e.g., 250-2 and 250-3), the write splitter is configured to block unexpected writes from the host servers and to support various types of image access and data read operations for the host servers.

In one exemplary embodiment of FIG. 2 where the replication system 260 is implemented using RecoverPoint, each replication system 260-1, 260-2, and 260-3 comprises a cluster of two or more active RPAs to provide scalability and high-availability in circumstances where one RPA in a cluster fails, and RecoverPoint immediately switches over to the remaining RPA(s) in the cluster. Each RPA cluster is a logical entity comprising a group of 2 to 8 physical or virtual RPAs that work together to replicate and protect data. The number of RPA clusters in a given RecoverPoint system will depend on the configuration of the RecoverPoint system (e.g., local protection only, local and remote protection, remote protection only). Each RPA is connected via FC to a SAN switch (e.g., 254-1, 254-2, 254-3) and is configured to access the host servers (e.g., SCSI initiator) and the storage array (e.g., SCSI target).

As noted above, RecoverPoint uses a journal-based implementation to maintain PiT information of all changes made to the protected data. RecoverPoint repository volumes are dedicated volumes on a SAN-attached storage at each site, wherein one repository volume is maintained for each RPA cluster (e.g., each replication system 260-1, 260-2, 260-3). The repository volumes maintain configuration information about the RPAs and consistency groups. There are two types of journal volumes including (i) replica journals and (ii) production journals.

The replica journals are utilized to hold snapshots that are either waiting to be distributed, or that have already been distributed to the replica storage. The replica journals also hold metadata for each image and bookmarks. Production journals are utilized when there is a link failure between sites, allowing synchronization to a replica when the link is re-established. A consistency group (CG) denotes a grouping of several LUNs together in order to ensure write-order consistency over several volumes, thereby allowing copies to be consistent.

For a CDP configuration, a write splitter on the host server sends a copy of the data write to the production LUN and the RPA. The write is acknowledged by the LUN and the RPA. The RPA writes the data to a journal volume along with a time stamp and bookmark metadata. The data is then distributed to a local replica in a write-order-consistent manner. For a CRR configuration, the RPA on the production site sends a write copy request to remote RPAs on one or more remote replica sites to perform a remote replication operation. Replication can be asynchronous or synchronous. In asynchronous replication, the write I/O from a host server is sent to a local RPA and the local RPA acknowledges the data write when data is stored in memory of the RPA. In synchronous mode, no data is acknowledged by the RPA until the data reaches the memory of the remote RPA(s) or persistent storage (e.g., local or remote replica storage), depending on whether a "measure lag to remote RPA" flag setting is enabled in the configuration. In synchronous replication, every write is retained in the replica journal, so that data recovery can be obtained to any point in time. In asynchronous replication, several writes are grouped in a single snapshot.

Figure 3:
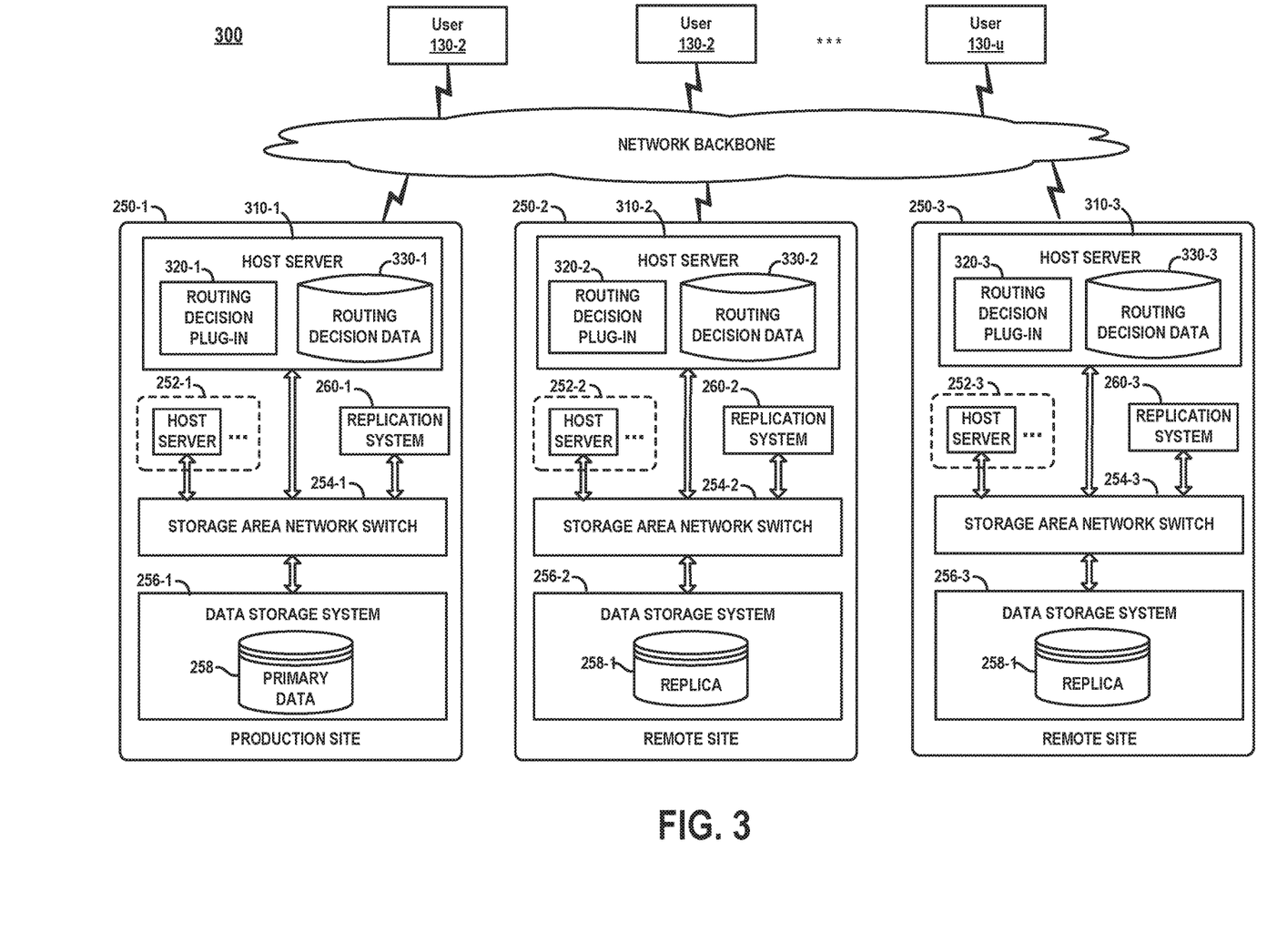
FIG. 3 schematically illustrates a cloud computing system which implements a data replication system that is configured to provide data read access to replica storage, according to another embodiment of the invention.

In one embodiment, as noted above, the cloud-based routing decision system 240 (FIG. 2) is implemented as a cluster of gateway servers which execute on physical sever machines or virtual machines. In another embodiment, a cloud-based routing decision system can be an application that executes as a plug-in of an application in a Linux or Windows-based operating system environment, wherein the plug-in executes methods for routing read/write requests as discussed herein. For example, FIG. 3 schematically illustrates a cloud computing system 300 which implements a data replication system that is configured to provide data read access to replica storage, according to another embodiment of the invention. The cloud computing system 300 of FIG. 3 is similar to the cloud computing system 200 of FIG. 2 except that the functionality of the cloud-based routing decision system 240 of FIG. 2 is implemented as software plug-ins that execute on host servers across the data centers 250-1, 250-2, and 250-3. In particular, as shown in FIG. 3, the data centers 250-1, 250-2, and 250-3 comprise respective host servers 310-1, 310-2, and 310-3 which execute routing decision plug-in components 320-1, 320-2 and 320-3, respectively. In addition, the routing decision plug-in components 320-1, 320-2 and 320-3 generate and maintain respective databases of routing decision metadata 330-1, 330-2, and 330-3 including replication topology information that is synchronized with the LUN replication information maintained by the replication system 260.

The intelligent routing decision systems and methods as discussed are configured to coordinate with a replication system and utilize advanced control policies for routing read requests in an optimal manner. In particular, the routing decision system essentially coordinates with replication system in terms of replication topology, replication load pressure, and replication lag status, etc., wherein such information is either exported to or collected on close-to-App routing layer basis. This information allows the routing decision system to make advanced control decisions in a replica-aware, performance-aware, or lag-aware, manner, or based on other routing policies such as affinity, etc., thereby allowing data read requests to be automatically and intelligently routed to the proper site for higher performance, load-balance etc.

Figure 4:
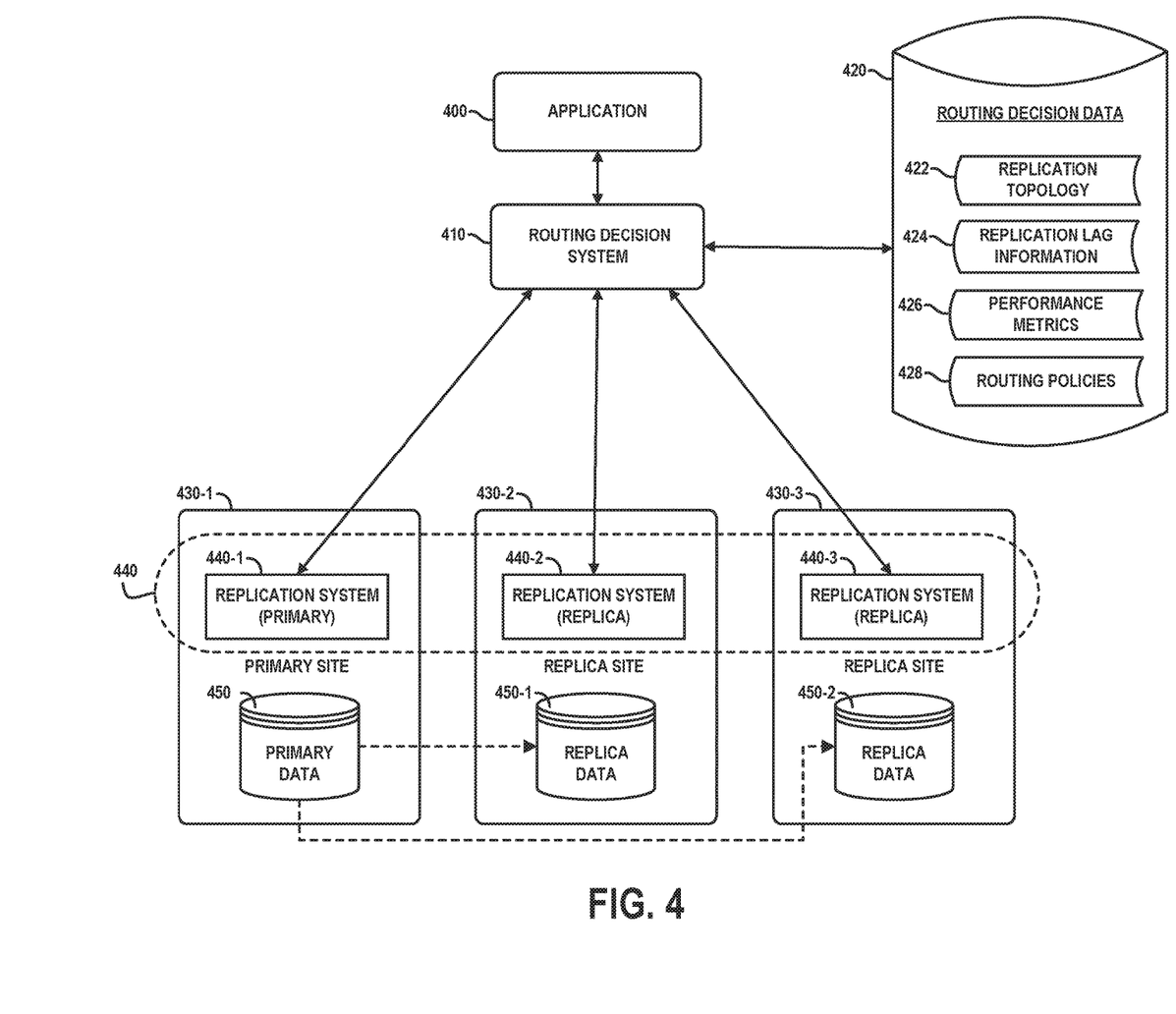
FIG. 4 schematically illustrates method of providing coordination between a routing decision system and a replication system to acquire information that is utilized by the routing decision system to make intelligent routing decisions, according to an embodiment of the invention.

FIG. 4 schematically illustrates method for providing coordination between a routing decision system and a replication system to acquire information that is utilized by the routing decision system to make intelligent routing decisions, according to an embodiment of the invention. In particular, FIG. 4 schematically illustrates a user application 400, a routing decision system 410, a database of routing decision metadata 420, a plurality of data processing sites including a primary site 430-1 and replica sites 430-2 and 430-3, a replication system 440 comprising distributed replication system components 440-1, 440-2, and 440-3, a primary data storage 450 maintained on the primary site 430-1, and replica storage 450-1 and 450-2 maintained on the replica sites 430-2 and 430-3. The database of routing decision metadata 420 comprises various types of metadata including replication topology data 422, replication lag information 424, performance metrics 426, and routing policies 428.

The replication topology information 422 allows the routing decision system 410 to operate in a "replica-aware" manner. For example, as the replication system 440 is reconfigured or otherwise changes over time (e.g., primary site and/or replica sites are changed), the routing decision system 410 can periodically obtain such modified replication topology information to update the database of routing decision data 420. The modified replication topology information can be obtained by the routing decision system 410 by periodically pulling such information from the replication system 440 or by having the replication system 440 automatically push such information to the routing decision system 410. This allows the user application 400 at a given location to have more flexibility in the choice of accessing data via read requests from a primary site or replica site. If a given site is lost or becomes unavailable, the replication system 440 can push such information to the routing decision system 410.

In another embodiment, the routing decision system 410 can make intelligent routing decisions in a "performance-aware" manner based on performance metrics 426. For example, the routing decision system 410 (e.g., routing decision plug-in) running on a specific host server together with the user application 400 may communicate to periodically check the access performance to all available sites, including the primary and replica sites, with regard to latency and bandwidth. In particular, in the background, the user application 400 may ping the primary site 430-1 and replica sites 430-2 and 430-3 so that the routing decision system 410 can determine and collect network latency information and then rank the network latency. In addition, in the background, the user application 400 can send a read request to read some test data from the primary site 430-1 and replica sites 430-2 and 430-3 to measure both latency and bandwidth with regard to networking, processing, and disk I/O, for example. In another embodiment, the routing decision system 410 can determine the read access latency and bandwidth for an actual read request issued by the user application 400. The performance metrics 426 (e.g., bandwidth data and/or read latency data) can subsequently be utilized for making intelligent decisions for routing read requests from the user application 400 and other applications either alone, or in combination with other policies (as described below) such as load balancing, affinity and locality.

In another embodiment, the routing decision system 410 can make intelligent routing decisions in a "load-aware" manner. In particular, the routing decision system 410 can balance the I/O requests that are issued by the routing decision system 410 to multiple sites. For example, load balancing can be performed using a round-robin process to all sites. In another embodiment, the performance metrics 426 can be utilized as weight parameter in conjunction with the amount/size of the I/O request to a specific site, and then determine a weighted balance for balancing the I/O load of the give primary and replica sites.

In other embodiments, the routing decision system 410 can make intelligent routing decisions in a replication lag-aware manner by monitoring and maintaining replication lag information 424. For example, if a replication system or continuous data protection system is configured for multiple replica sites (which could be common for enterprise users), even with all replica sites running in CDP mode, data replication performance from a primary site to each replica site may be different such as due to unpredictable interconnection, which leads to different replication lag. The primary replication system 440-1 can monitor such replication lag, and report the replication lag to the routing decision system 410. Based on the replication lag information, the routing decision system 410 may utilize the replication lag information as a factor in determining where to route a read access request. For example, if a given application needs access to real-time data, the routing decision system 410 can direct read requests from the given application to the primary site 430-1, or to the most updated replica site of the given a replica sites 430-2 and 430-3.

Figure 5:
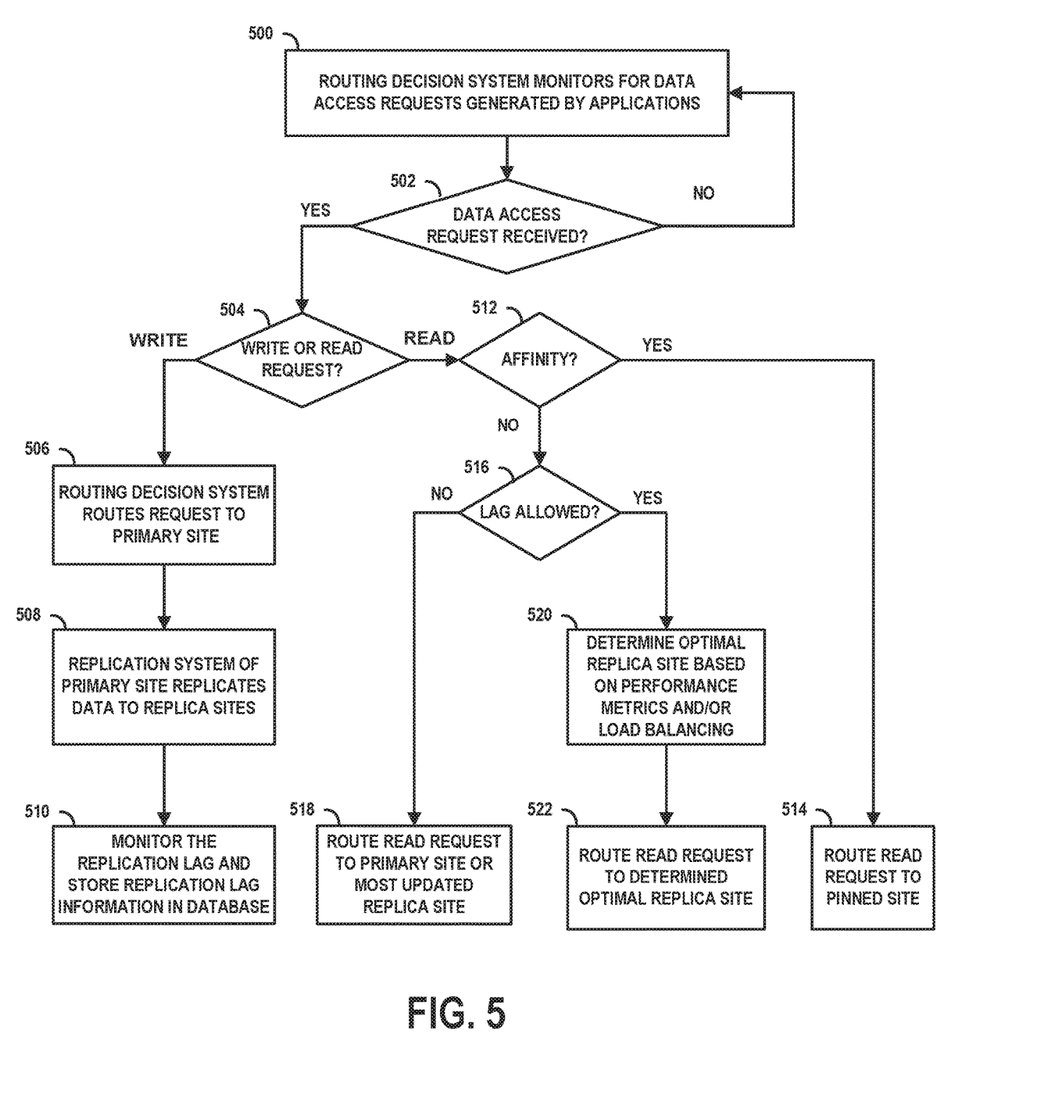
FIG. 5 is a flow diagram of a method that is implemented by a routing decision system to intelligently route data access requests to primary and replica sites of a cloud computing system, according to an embodiment of the invention.

In other embodiments, the routing decision system 410 is configured to make intelligent routing decisions based on advanced setting such as locality and affinity. In particular, with regard to locality and consistency, write requests (e.g., data generation from sensors/devices) will be routed to the primary site 430-1 to be written to the primary data storage 450. While most subsequent requests are read-intensive (e.g., for data analytics), there can be a circumstance in which a user application issues a "read-after-write" access request (e.g., read your own write). This pattern can be detected (e.g., read previous write within a time threshold such as 30 sec), and route the read to the primary site as well. This also ensures data consistency in the situation where, e.g., the write operation has not yet replicated to the replica sites. In this case, one may achieve higher performance as the data is likely cached in a content delivery network (CDN) or in memory of the primary site. With regard to affinity, a user application may set a pin affinity to specific site so that the data access requests from the given application will always be routed to specific site for accessing data (e.g., for purposes such as cost or compliance, etc.) FIG. 5 is a flow diagram of a method that is implemented by a routing decision system to route data access requests to primary and replica sites of a cloud computing system, according to an embodiment of the invention. In particular, FIG. 5 illustrates exemplary modes of operation of the routing decisions systems discussed above in FIGS. 2, 3 and 4. A routing decision system monitors for data access requests generated by applications (block 500). When a data access request is received from a given application (affirmative determination in block 502), the routing decision system determines if the data access request is a write request or read request (block 504). If the data access request is a write request, the routing decision system will route the write request to a primary site of the cloud computing system (block 506). The replication system hosted by the primary site will commence a replication operation to replicate the newly written data to the replica sites (block 508). The routing decision system will monitor the replication lag associated with the replication operation and store the replication lag information in a database of routing decision data (block 510).

On the other hand, if the data access request is determined to be a read request (block 504), a determination is made as to whether data access requests for the given application have an affinity setting that pins the data access request to a specific site (block 512). If an affinity setting is specified for the given application (affirmative determination in block 512), the routing decision system will route the read request to the specified pinned site (block 514), which could be a primary site or replica site. On the other hand, if an affinity setting is not set or otherwise specified for the given application (negative determination in block 512), a determination is made as to whether replication lag is acceptable for the given application (block 516).

If it is determined that replication lag is not allowed for the given application (negative determination in block 516), the routing decision system will route the read request to the primary site or to a most updated replica site (block 518) to reduce or minimize read access latency. As noted above, based on the replication lag information, the routing decision system may utilize the replication lag information as a factor in determining where to route a read access request wherein if the application required access to real-time, updated information, the routing decision system will direct the application read request to a site (e.g., primary site or replica site) which has the most updated, newly written data.

On the other hand, if it is determined that replication lag is allowed (affirmative determination in block 516), the routing decision system will determine an optimal replica site to which the read request can be routed based on performance metrics, or load balancing, or a weighted combination of performance metrics and load balancing (block 520). The routing decision system will then route the read request to the determined optimal replica site (block 522). In other embodiments, the optimal site may be a primary site which, for example, is closest in physical distance to the location of the given application.

Figure 6:
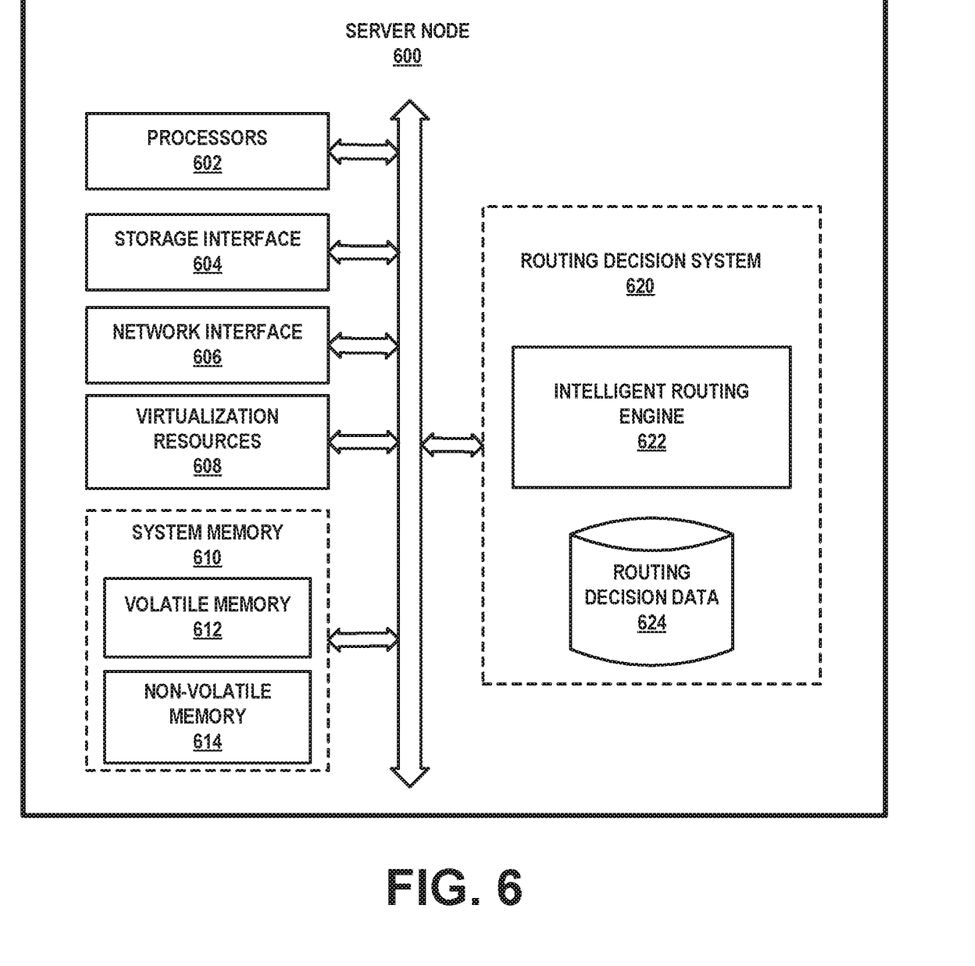
FIG. 6 schematically illustrates an embodiment of a computing node which can host an intelligent routing decision system, according to an embodiment of the invention.

FIG. 6 schematically illustrates an embodiment of a computing node which can host an intelligent routing decision system, according to an embodiment of the invention. In particular, FIG. 6 schematically illustrates an embodiment of a server node 600 which can host an intelligent routing system, according to an embodiment of the invention. The server node 600 comprises processors 602, storage interface circuitry 604, network interface circuitry 606, virtualization resources 608, and system memory 610. The system memory 610 comprises volatile memory 612 and non-volatile memory 614 which is implemented as storage class memory. The server node 600 hosts a routing decision system 620, which comprises an intelligent routing engine 622 and routing decision data 624. The intelligent routing engine 622 implements the functionality of the routing decision systems discussed above (e.g., operating modes discussed in FIG. 5) using the routing decision data 624 (e.g., various types of data as shown in FIG. 4).

The processors 602 comprise one or more types of hardware processors that are configured to process program instructions and data to execute a native operating system (OS) and applications that run on the server node 600. For example, the processors 602 may comprise one or more central processing units (CPUs), a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, GPUs, digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general-purpose processor.

The storage interface circuitry 604 enables the processors 602 to interface and communicate with the system memory 610, and other local storage and off-infrastructure storage media, using one or more standard communication and/or storage control protocols to read data from or write data to volatile and non-volatile memory/storage devices. Such protocols include, but are not limited to, Non-Volatile Memory Express (NVMe), Peripheral Component Interconnect Express (PCIe), Parallel ATA (PATA), Serial ATA (SATA), Serial Attached SCSI (SAS), Fibre Channel, etc. The network interface circuitry 606 enables the server node 600 to interface and communicate with a network and other system components. The network interface circuitry 606 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, direct memory access (DMA) and RDMA data transfer protocols, etc.

The virtualization resources 608 can be instantiated to execute one or more applications or functions which are hosted by the server node 600. For example, the virtualization resources 608 can be configured to implement the various modules and functionalities of the routing decision system 620. In one embodiment, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 and the routing decision system 620. In yet another embodiment, containers may be used in combination with other virtualization infrastructure such as virtual machines implemented using a hypervisor, wherein Docker containers or other types of LXCs are configured to run on virtual machines in a multi-tenant environment.

In one embodiment, the routing decision system 620 comprises software that is persistently stored in the local storage resources and loaded into the system memory 610 resources, and executed by the processors 602 to perform respective functions as described herein. In this regard, the system memory 610 resources, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile random-access memory (RAM), non-volatile random-access memory (NVRAM), or other types of memory, in any combination. The term "memory" or "system memory" as used herein refers to volatile and/or non-volatile memory which is utilized to store application program instructions that are read and processed by the processors 602 to execute a native operating system and one or more applications hosted by the server node 600, and to temporarily store data that is utilized and/or generated by the native OS and application programs running on the server node 600. For example, the volatile memory 612 may be a dynamic random-access memory (DRAM) (e.g., DRAM DIMM (Dual In-line Memory Module), or other forms of volatile RAM. The non-volatile memory 614 can be configured and accessible as a memory resource. For example, the non-volatile memory 614 may be one or more of a NAND Flash storage device, an SSD device, or other types of next generation non-volatile memory (NGNVM) devices. The non-volatile memory 614 can be implemented with any suitable NGNVM DIMM, or NGNVM add-in card (AIC) module.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:

configuring a data replication system to execute in a plurality of sites of a computing system, wherein the plurality of sites comprises a primary site and at least one replica site, wherein the primary site comprises a primary storage to store primary data of a given application, and wherein the at least one replica site comprises a replica storage to store a replica of the primary data;

configuring a routing decision system to execute in a distributed manner in each site of the plurality of sites of the computing system, and to communicate with the data replication system to acquire information which is maintained by the routing decision system in a database of routing decision data to coordinate routing of data access requests, wherein at least a portion of the database of routing decision data is maintained in a distributed manner in each site of the plurality of sites of the computing system;

receiving, by the routing decision system, a data access request from the given application executing on a client device in a geographical location;

responsive to the data access request comprising a data write request, the routing decision system routing the data write request to the primary site to write data to the primary storage;

responsive to the data access request comprising a data read request, the routing decision system determining which site of the plurality of sites of the computing system for handling the data read request, wherein determining comprises utilizing the database of routing decision data to determine which given site among the plurality of sites including the primary site and the at least one replica site provides a lowest read access latency for accessing data from the given site to respond to the data read request of the given application based, at least in part, on which site among the plurality of sites resides in a geographical location which is closest in physical distance to the geographical location of the client device which executes the given application;

routing, by the routing decision system, the data read request to the at least one replica site, in response to determining that the at least one replica site provides a lower read access latency for accessing data from the replica storage as compared to accessing data from the primary storage of the primary site based, at least in part, on a determination that the geographical location of the at least one replica site is closest in physical distance to the geographical location of the client device which executes the given application; and routing, by the routing decision system, the data read request to the primary site, in response to determining that the primary site provides a lower read access latency for accessing data from the primary storage as compared to accessing data from the replica storage of the at least one replica site based, at least in part, on a determination that the geographical location of the primary site is closest in physical distance to the geographical location of the client device which executes the given application;

wherein configuring the routing decision system to execute in a distributed manner in each site of the plurality of sites of the computing system comprises running an application plug-in, which implements functions of the routing decision system, on at least one host server of each site of the plurality of sites of the computing system.

2. The method of claim 1, wherein determining which site of the plurality of sites of the computing system for handling the data read request further comprises utilizing, by the routing decision system, the database of routing decision data to determine if an affinity setting for a given site among the plurality of sites of the computing system is specified by the given application; and in response to determining that an affinity setting is specified by the given application, routing the read request to the given site among the plurality of sites of the computing system which has an affinity setting as specified by the given application.

3. The method of claim 1, wherein responsive to the data access request comprising a data read-after-data write request, routing the data access request to the primary site to write data to the primary storage, and to read data from the primary storage.

4. The method of claim 1, further comprising:
subsequent to writing data to the primary storage, performing a replication operation by the data replication system to update the replica of the primary data stored in the replica storage of the at least one replica site;
determining a replication lag of the replication operation; and
storing replication lag information regarding the determined replication lag in the database of routing decision data.

5. The method of claim 4, further comprising routing the data read request to the at least one replica site, in response to determining that (i) the at least one replica site provides a lower read access latency for accessing data from the replica storage as compared to accessing data from the primary storage, and (ii) the replica storage comprises a currently updated replica of the primary data in the primary storage, based on the stored replication lag information.

6. The method of claim 4, further comprising routing the data read request to the primary site in response to determining that only the primary site has an updated version of the primary data, irrespective of whether the at least one replica site provides a lower read access latency for accessing data from the replica storage as compared to accessing data from the primary storage.

7. An article of manufacture comprising a non-transitory processor-readable storage medium having stored therein program code of one or more software programs, wherein the program code is executable by one or more processors to perform a method:

configuring a data replication system to execute in a plurality of sites of a computing system, wherein the plurality of sites comprises a primary site and at least one replica site, wherein the primary site comprises a primary storage to store primary data of a given application, and wherein the at least one replica site comprises a replica storage to store a replica of the primary data;

configuring a routing decision system to execute in a distributed manner in each site of the plurality of sites of the computing system, and to communicate with the data replication system to acquire information which is maintained by the routing decision system in a database of routing decision data to coordinate routing of data access requests, wherein at least a portion of the database of routing decision data is maintained in a distributed manner in each site of the plurality of sites of the computing system;

receiving, by the routing decision system, a data access request from the given application executing on a client device in a geographical location;

responsive to the data access request comprising a data write request, the routing decision system routing the data write request to the primary site to write data to the primary storage;

responsive to the data access request comprising a data read request, the routing decision system determining which site of the plurality of sites of the computing system for handling the data read request, wherein determining comprises utilizing the database of routing decision data to determine which given site among the plurality of sites including the primary site and the at least one replica site provides a lowest read access latency for accessing data from the given site to respond to the data read request of the given application based, at least in part, on which site among the plurality of sites resides in a geographical location which is closest in physical distance to the geographical location of the client device which executes the given application;

routing, by the routing decision system, the data read request to the at least one replica site, in response to determining that the at least one replica site provides a lower read access latency for accessing data from the replica storage as compared to accessing data from the primary storage of the primary site based, at least in part, on a determination that the geographical location of the at least one replica site is closest in physical distance to the geographical location of the client device which executes the given application; and routing, by the routing decision system, the data read request to the primary site, in response to determining that the primary site provides a lower read access latency for accessing data from the primary storage as compared to accessing data from the replica storage of the at least one replica site based, at least in part, on a determination that the geographical location of the primary site is closest in physical distance to the geographical location of the client device which executes the given application;

wherein configuring the routing decision system to execute in a distributed manner in each site of the plurality of sites of the computing system comprises running an application plug-in, which implements functions of the routing decision system, on at least one host server of each site of the plurality of sites of the computing system.

8. The article of manufacture of claim 7, wherein determining which site of the plurality of sites of the computing system for handling the data read request further comprises utilizing, by the routing decision system, the database of routing decision data to determine if an affinity setting for a given site among the plurality of sites of the computing system is specified by the given application; and in response to determining that an affinity setting is specified by the given application, routing the read request to the given site among the plurality of sites of the computing system which has an affinity setting as specified by the given application.

9. The article of manufacture of claim 7, wherein responsive to the data access request comprising a data read-after-data write request, routing the data access request to the primary site to write data to the primary storage, and to read data from the primary storage.

10. The article of manufacture of claim 7, wherein the program code is further executable by the one or more processors to perform a method comprising:

subsequent to writing data to the primary storage, performing a replication operation by the data replication system to update the replica of the primary data stored in the replica storage of the at least one replica site;

determining a replication lag of the replication operation; and storing replication lag information regarding the determined replication lag in the database of routing decision data.

11. The article of manufacture of claim 10, wherein the program code is further executable by the one or more processors to perform a method comprising routing the data read request to the at least one replica site, in response to determining that (i) the at least one replica site provides a lower read access latency for accessing data from the replica storage as compared to accessing data from the primary storage, and (ii) the replica storage comprises a currently updated replica of the primary data in the primary storage, based on the stored replication lag information.

12. The article of manufacture of claim 10, wherein the program code is further executable by the one or more processors to perform a method comprising routing the data read request to the primary site in response to determining that only the primary site has an updated version of the primary data, irrespective of whether the at least one replica site provides a lower read access latency for accessing data from the replica storage as compared to accessing data from the primary storage.

13. A computing system, comprising:

a data replication system configured to execute in a plurality of sites of the computing system, wherein the plurality of sites comprises a primary site and at least one replica site, wherein the primary site comprises a primary storage to store primary data of a given application, and wherein the at least one replica site comprises a replica storage to store a replica of the primary data; and a routing decision system which is configured to execute in a distributed manner in each site of the plurality of sites of the computing system, and to communicate with the data replication system to acquire information which is maintained by the routing decision system in a database of routing decision data to coordinate routing of data access requests, wherein at least a portion of the database of routing decision data is maintained in a distributed manner in each site of the plurality of sites of the computing system, and wherein the routing decision system is configured to execute a process comprising:

receiving a data access request from the given application executing on a client device in a geographical location;

responsive to the data access request comprising a data write request, routing the data write request to the primary site to write data to the primary storage;

responsive to the data access request comprising a data read request, determining which site of the plurality of sites of the computing system for handling the data read request, wherein determining comprises utilizing a database of routing decision data to determine which given site among the plurality of sites including the primary site and the at least one replica site provides a lowest read access latency for accessing data from the given site to respond to the data read request of the given application based, at least in part, on which site among the plurality of sites resides in a geographical location which is closest in physical distance to the geographical location of the client device which executes the given application;

routing the data read request to the at least one replica site, in response to determining that the at least one replica site provides a lower read access latency for accessing data from the replica storage as compared to accessing data from the primary storage of the primary site based, at least in part, on a determination that the geographical location of the at least one replica site is closest in physical distance to the geographical location of the client device which executes the given application; and routing the data read request to the primary site, in response to determining that the primary site provides a lower read access latency for accessing data from the primary storage as compared to accessing data from the replica storage of the at least one replica site based, at least in part, on a determination that the geographical location of the primary site is closest in physical distance to the geographical location of the client device which executes the given application;

wherein the routing decision system is configured to execute in a distributed manner in each site of the plurality of sites of the computing system by running an application plug-in, which implements functions of the routing decision system, on at least one host server of each site of the plurality of sites of the computing system.

14. The method of claim 1, wherein the plurality of sites of the computing system comprises data centers that are located in different geographical locations.

15. The article of manufacture of claim 7, wherein the plurality of sites of the computing system comprises data centers that are located in different geographical locations.

16. The computing system of claim 13, wherein the plurality of sites of the computing system comprises data centers that are located in different geographical locations.

17. The computing system of claim 13, wherein in determining which site of the plurality of sites of the computing system for handling the data read request, the routing decision system is configured to utilize the database of routing decision data to determine if an affinity setting for a given site among the plurality of sites of the computing system is specified by the given application, and in response to determining that an affinity setting is specified by the given application, route the read request to the given site among the plurality of sites of the computing system which has an affinity setting as specified by the given application.

18. The computing system of claim 13, wherein in response to the data access request comprising a data read-after-data write request, the routing decision system is configured to route the data access request to the primary site to write data to the primary storage, and to read data from the primary storage.

19. The computing system of claim 13, wherein subsequent to writing data to the primary storage, the data replication system is configured to:
perform a replication operation to update the replica of the primary data stored in the replica storage of the at least one replica site;
determine a replication lag of the replication operation; and
store replication lag information regarding the determined replication lag in the database of routing decision data.

20. The computing system of claim 19, wherein the routing decision system is configured to:
route the data read request to the at least one replica site, in response to determining that (i) the at least one replica site provides a lower read access latency for accessing data from the replica storage as compared to accessing data from the primary storage, and (ii) the replica storage comprises a currently updated replica of the primary data in the primary storage, based on the stored replication lag information; and
route the data read request to the primary site in response to determining that only the primary site has an updated version of the primary data, irrespective of whether the at least one replica site provides a lower read access latency for accessing data from the replica storage as compared to accessing data from the primary storage.

* * * * *